US008611207B2

(12) United States Patent
Takakuwa

(10) Patent No.: US 8,611,207 B2
(45) Date of Patent: Dec. 17, 2013

(54) DATA TRANSMITTER AND DATA TRANSMISSION METHOD

(75) Inventor: Makoto Takakuwa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 383 days.

(21) Appl. No.: 12/607,687

(22) Filed: Oct. 28, 2009

(65) Prior Publication Data

US 2010/0128726 A1   May 27, 2010

(30) Foreign Application Priority Data

Nov. 27, 2008   (JP) ................................ 2008-303082

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |

(52) U.S. Cl.
USPC .......................................... 370/218; 370/225

(58) Field of Classification Search
None
See application file for complete search history.

(56) References Cited

U.S. PATENT DOCUMENTS

| 5,280,487 | A | * | 1/1994 | Bergkvist ..................... 714/797 |
| 5,887,000 | A | | 3/1999 | Adachi et al. |
| 5,953,352 | A | * | 9/1999 | Meyer ........................... 714/820 |
| 6,052,373 | A | * | 4/2000 | Lau .............................. 370/399 |
| 6,683,854 | B1 | * | 1/2004 | Blanc et al. .................. 370/241 |
| 6,810,121 | B1 | | 10/2004 | Ikesue |
| 6,909,698 | B1 | * | 6/2005 | Moon ........................... 370/252 |
| 2002/0089926 | A1 | * | 7/2002 | Kloth ............................ 370/220 |
| 2006/0120396 | A1 | * | 6/2006 | Hasegawa et al. ........... 370/432 |
| 2008/0279181 | A1 | | 11/2008 | Shake et al. |

FOREIGN PATENT DOCUMENTS

| JP | 05-327753 | 12/1993 |
| JP | 8-37527 | 2/1996 |
| JP | 09-162878 | 6/1997 |
| JP | 2000165916 | 6/2000 |
| JP | 2005-260742 | 9/2005 |
| JP | 2006174406 | 6/2006 |
| JP | 2007-507990 | 3/2007 |
| WO | 2005/038599 A2 | 4/2005 |

OTHER PUBLICATIONS

Japan Office Action issued Aug. 21, 2012 in corresponding Japanese Patent Application No. 2008-303082 (5 pages) (5 pages English translation).

* cited by examiner

*Primary Examiner* — John Blanton
*Assistant Examiner* — Christopher Crutchfield
(74) *Attorney, Agent, or Firm* — Staas & Halsey LLP

(57) ABSTRACT

A data transmitter is provided. The data transmitter is configured to transmit reception data and copy data of the reception data to the outside via respective separate ports. The data transmitter includes an identification information attaching unit configured to attach, to the reception data, identification information identifying the reception data, a reception data copying unit configured to copy the reception data with the identification information attached thereto, a data calculation unit configured to perform the same calculation operation on the reception data with the identification data attached thereto and the copy data copied by the reception copying unit, and an identity determiner unit configured to determine whether the reception data with the identification data attached thereto is identical to the copy data, based on the identification data and the calculation results of the data calculation operation.

17 Claims, 7 Drawing Sheets

DATA TRANSMITTER AND DATA TRANSMISSION METHOD

CROSS-REFERENCE TO RELATED APPLICATION(S)

This application is related to and claims priority to Japanese Patent Application No. 2008-303082, filed on Nov. 27, 2008, and incorporated herein by reference.

BACKGROUND

1. Field

The embodiments discussed herein are directed to data copying and, in particular, to determination of data identity between copy source data and copied data.

2. Description of the Related Art

Telephone networks constructed on the basis of the existing circuit switching technology are being replaced with communication networks of IP (Internet Protocol) packet base on the basis of a packet switching technology. In addition, the backbone transmission networks of layer 2 are also being replaced with an Ethernet (registered trademark) based transmission method, which is low-cost and compatible with the IP packet. Regardless of the low cost of a system (data transmitter) used in the backbone transmission network, fault tolerance and maintainability required of the known transmission technique of SDH/SONET (Synchronous Digital Hierarchy/Synchronous Optical NETwork) are still required for such a system. Japanese Laid-open Patent Publication No. 08-37527 and Japanese Laid-open Patent Publication No. 2005-260742 disclose related arts.

For system maintainability, the Ethernet based packet transmission system may be required to incorporate a monitoring of the content of an output packet e.g., output port mirror or port mirroring. In such a system, an output mirror port may be provided in a card separate from an interface card outputting normal data.

SUMMARY

It is an aspect of an exemplary embodiment discussed herein to provide a data transmitter and data transmission method.

The above aspects can be attained by a data transmitter configured to transmit reception data and copy data of the reception data to the outside via respective separate ports, including an identification information attaching unit configured to attach, to the reception data, identification information identifying the reception data, a reception data copying unit configured to copy the reception data with the identification information attached thereto, a data calculation unit configured to perform the same calculation operation on the reception data with the identification data attached thereto and the copy data copied by the reception copying unit; and an identity determiner unit configured to determine whether the reception data with the identification data attached thereto is identical to the copy data, based on the identification data and the calculation results of the data calculation operation.

The above aspects can be attained by a data transmission method configured to transmit reception data and copy data of the reception data to the outside via respective separate ports, wherein an identification information attaching unit attaches, to the reception data, identification information identifying the reception data; a reception data copying unit copies the reception data with the identification information attached thereto; a data calculation unit performs the same calculation operation on the reception data with the identification data attached thereto and the copy data copied by the reception copying unit; and an identity determiner unit determines whether the reception data with the identification data attached thereto is identical to the copy data, based on the identification data and the calculation results of the data calculation operation. The object and advantages of the invention will be realized and attained by means of the elements and combinations particularly pointed out in the claims. It is to be understood that both the foregoing general description and the following detailed description are exemplary and explanatory and are not restrictive of the invention, as claimed.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF AN EXEMPLARY EMBODIMENTS

The use of an output mirror port may require that normal output data be identical to copy data copied from the normal output data. The identity of these two units of data cannot be conventionally assured because of traffic congestion along a path within a transmitter.

Figure 1:
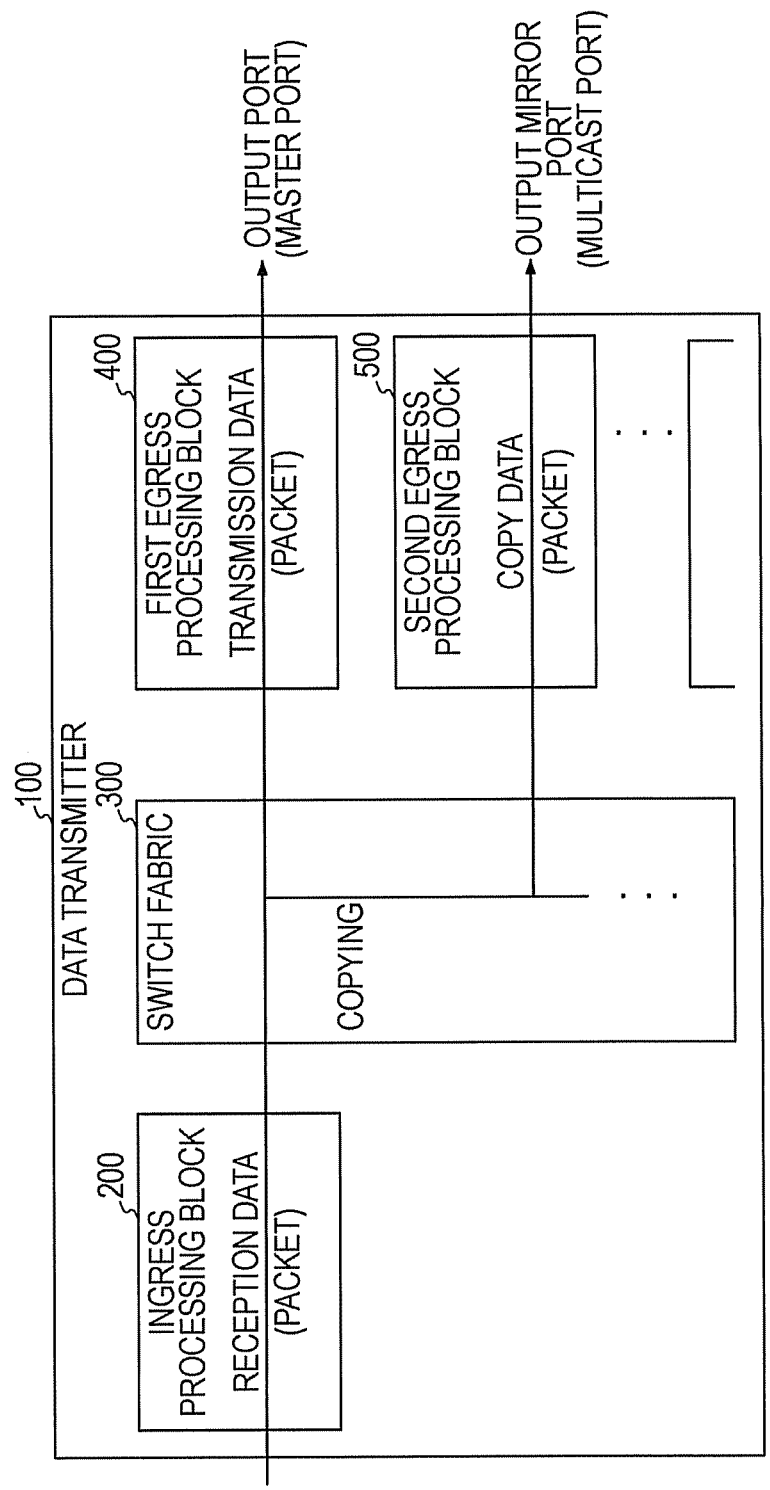
FIG. 1 illustrates a data transmitter of an exemplary embodiment.

FIG. 1 illustrates a data transmitter 100. As illustrated in FIG. 1, the data transmitter 100 includes an ingress processing block 200, a switch fabric 300, a first egress processing block 400, and a second egress processing block 500. The ingress processing block 200 processes reception data (packet) input from a line, and sends the processed data to the switch fabric 300.

The switch fabric 300 copies data transferred from the ingress processing block 200, and transfers the copy data to the second egress processing block 500. The first egress processing block 400 and the second egress processing block 500 perform respective processes to output transmission data supplied from the switch fabric 300 and a copied version of the transmission data to respective lines.

The first egress processing block 400, including an "output port" for use in normal data transmission, outputs the transmission data through the output port.

In other words, the data transmitter 100 is connected to another transmitter and a terminal via the output port. Normal data communication is thus performed between the data transmitter 100 and the other devices.

The second egress processing block 500, including an "output mirror port" used during malfunction or monitoring, outputs copy data to the outside via the output mirror port. The data transmitter 100 may handle the packets by packet or by group with each group including a plurality of packets.

FIG. 1 illustrates one second egress processing block 500. In an exemplary embodiment, the data transmitter 100 may include a plurality of second egress processing blocks 500. The e-tree multicast packet may be acceptable as a data structure. The output port corresponds to a "master port," and the output mirror port corresponds to a "multicast port."

The data transmitter 100 determines whether the transmission data output via the output port is identical to the copy data output via the output mirror port as will be described later, and performs a variety of processes depending on the determination results. In an exemplary embodiment, the data transmitter 100 may include a plurality of interface cards, and the first egress processing block 400 and the second egress processing block 500 may be included in each of the interface cards.

The difference between the output port mirror and the multicast packet such as the e-tree is that all the packets output from the output port in the output port mirror are copied in the output port mirror while a packet of a particular type (flow) only is copied in the multicast packet. Further in the output port mirror, the number of copy packets is one for the packet output from the standard output port, in other words, the determination of whether the same packet is output or not is performed on one port only. In the multicast packet, a plurality of copy packets are present, in other words, the determination of whether the same packet is output or not is performed on a plurality of ports.

Figure 2:
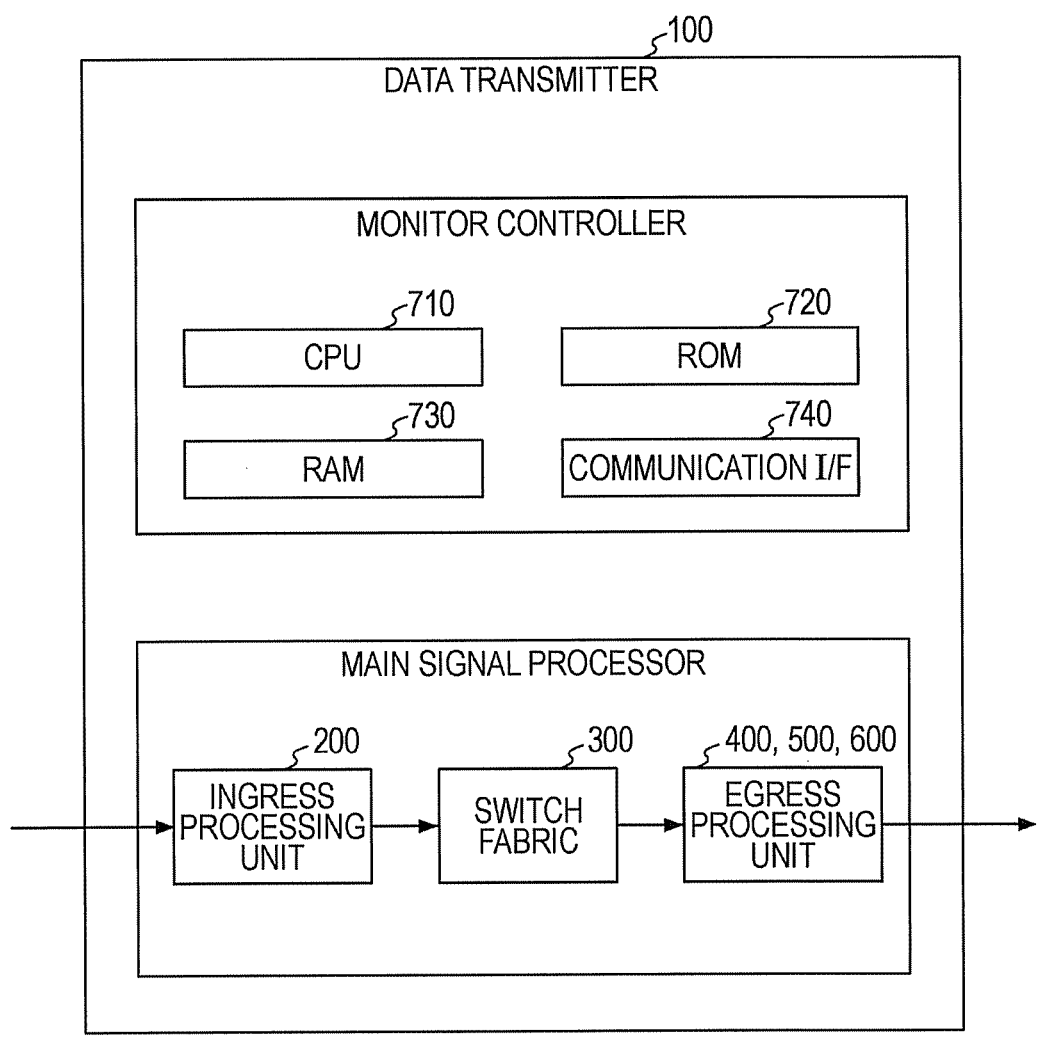
FIG. 2 illustrates an exemplary data transmitter.

FIG. 2 illustrates a hardware structure of the data transmitter 100. As illustrated in FIG. 2, the data transmitter 100 includes a monitor controller and a main signal processor. The monitor controller includes central processing unit (CPU) 710, read-only memory (ROM) 720, random-access memory (RAM) 730, and communication interface 740. The main signal processor includes ingress processing block 200, switch fabric 300, and egress processing blocks 400, 500, and 600.

The CPU 710 executes a program stored on the ROM 720. The CPU 710 processes data loaded onto the RAM 730 in response to an instruction of the program, and generally controls the data transmitter 100. The ROM 720 stores the program to be executed by the CPU 710 and data. When the CPU 710 executes the program stored the ROM 720, the CPU 710 expands (loads) the program and the data on the RAM 730, and temporarily stores calculation data on the RAM 730 during processing.

The communication interface 740 exchanges information (data) with another peripheral device connected thereto in a wired or wireless communication network and having a communication control function.

Units in the data transmitter 100 may be implemented using software or hardware. In the case of software, the units may be implemented when the CPU 710 executes the program stored on the ROM 720 and corresponding to the and the processing units. The processes may be implemented in a hardware structure.

Figure 3:
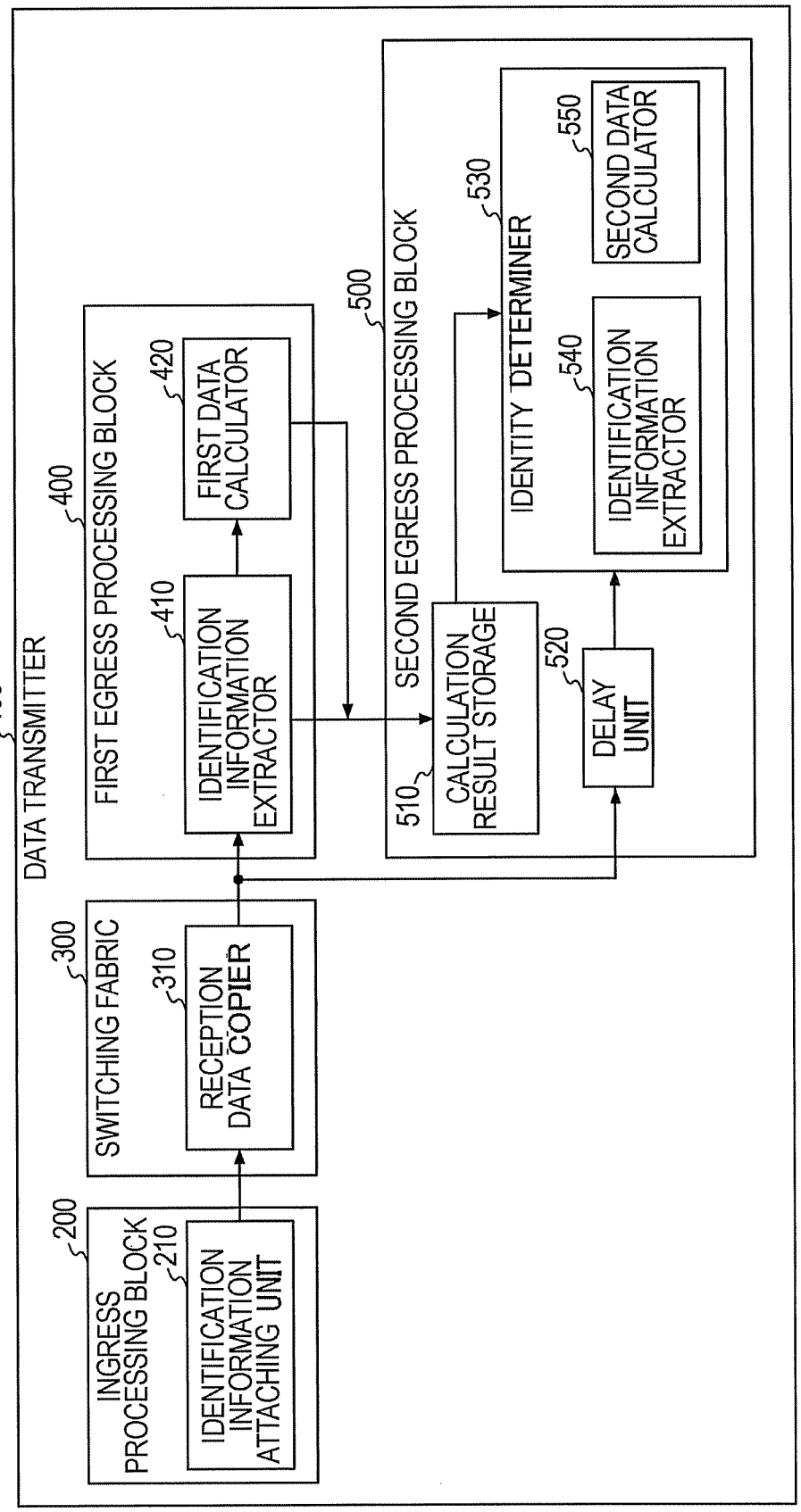
FIG. 3 illustrates an exemplary data transmitter.

FIG. 3 illustrates an exemplary operation of the data transmitter 100. As illustrated in FIG. 3, the data transmitter 100 includes the ingress processing block 200, the switch fabric 300, the first egress processing block 400, and the second egress processing block 500.

The ingress processing block 200 includes identification information attaching unit 210. The identification information attaching unit 210 attaches, to reception data, identification information unique to the reception data. The identification information starts with 0 or 1. Upon reaching a predetermined maximum value (10000, for example), the identification information returns to 0 or 1 to cycle through as a sequence number. It is important that the identification information identifies the reception data (packet). The identification information attaching unit 210 then supplies to the switch fabric 300 the reception data with the identification information added thereto (hereinafter referred to as "transmission data").

The ingress processing block 200 may include a plurality of copy instruction determination (not shown). The copy instruction determination determines whether target reception data (packet) is to be copied and then to be transferred to the second egress processing block 500. If it is determined that the target reception data is to be transferred to the second egress processing block 500, the copy instruction determination attaches an identifier, such as a flag, identifying the determination to the reception data (packet). The reception data copier 310 to be discussed later copies the data in response to the flag, and then transfers the copy data to the second egress processing block 500. In an exemplary embodiment, the determination of whether the reception data is to be transferred or not may be based on a learning table of media access control (MAC) addresses. In another embodiment, the determination of whether the reception data is to be transferred or not may be determined based on whether information such as a predetermined destination MAC address or a virtual local area network (VLAN) tag is contained in the reception data. The process of the copy instruction determination may be performed prior to or subsequent to the process of the identification information attaching unit 210. In an exemplary embodiment, another operation of processing the reception data may be performed prior to or subsequent to the process of the identification information attaching unit 210.

The switch fabric 300 includes reception data copier 310. The reception data copier 310 copies the reception data having the identification information attached thereto by the identification information attaching unit 210 (the transmission data), and supplies the transmission data as the original data to the first egress processing block 400. The copy data thus copied is supplied to the second egress processing block 500.

Figure 4:
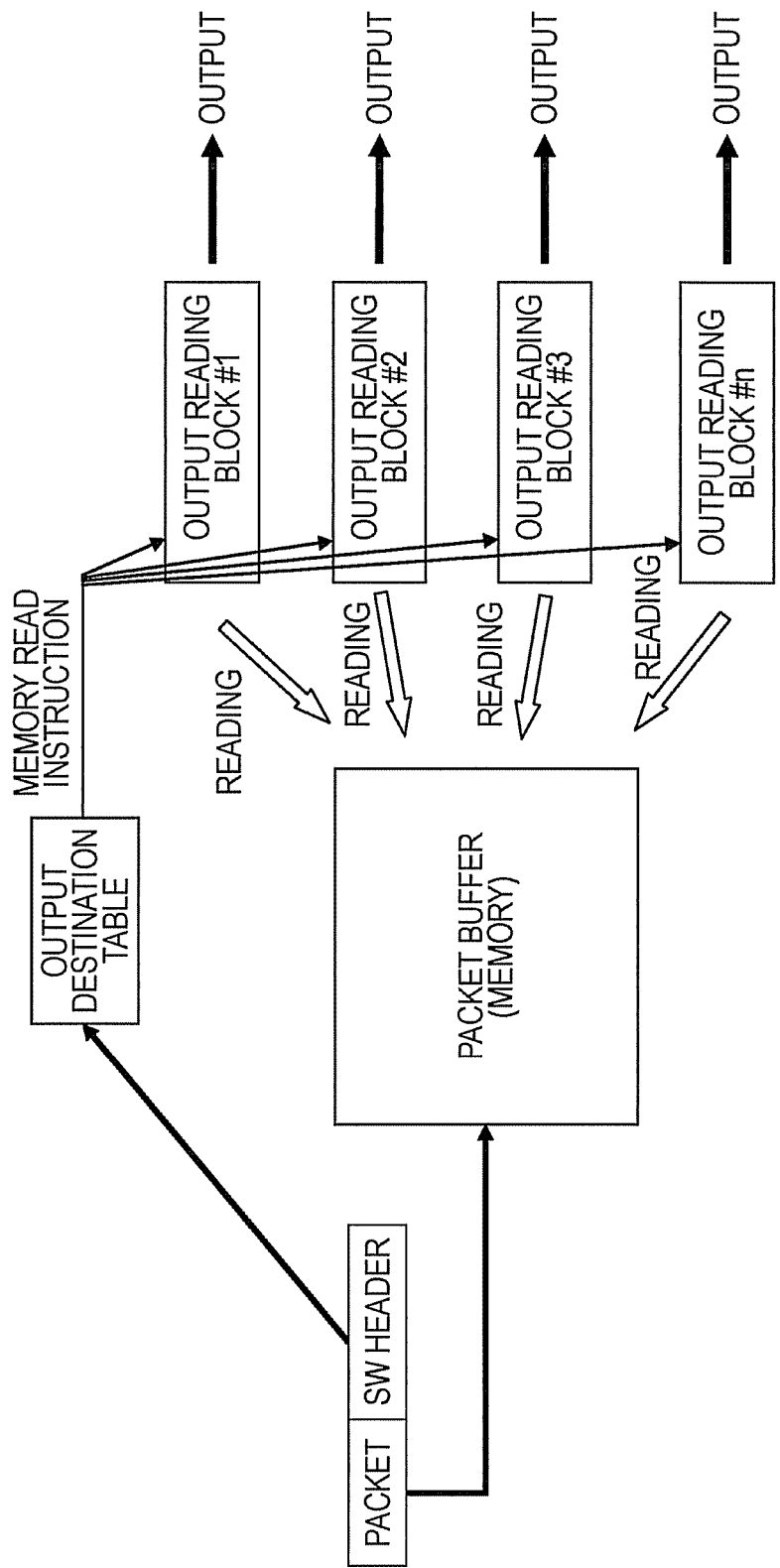
FIG. 4 illustrates a copying process of reception data through a switch fabric of an exemplary embodiment.

A header (SW header in FIG. 4) commanding the data to be transferred via two paths is contained in the data. When the reception data copier 310 performs a copying process on the data as illustrated in FIG. 4, the reception data copier 310 acquires, from the header information, information as where to output the data. The reception data copier 310 issues a data read instruction, instructing an output reading block to read data from a packet buffer. A data read instruction in one-path transfer is also acceptable.

The reception data copier 310 detects the flag attached by the copy instruction determination. In an exemplary embodiment, only if the flag is detected, the copying process and the transfer process are performed.

The first egress processing block 400 includes identification information extractor 410 and first data calculator 420. The identification information extractor 410 extracts (detects) the identification information, attached by the identification information attaching unit 210, from the transmission data transferred by the reception data copier 310. The identification information extractor 410 then notifies calculation result storage 510 of the identification information.

As illustrated in FIG. 3, the first data calculator 420 performs a predetermined calculation process on the transmission data transferred by the reception data copier 310, and then notifies the calculation result storage 510 of the result of the predetermined calculation process. In the predetermined calculation process, predetermined data corresponds to the result of the predetermined calculation process performed on the predetermined data. For example, the predetermined calculation process may be a cyclic redundancy check (CRC) calculation process. The predetermined calculation process performed by the first data calculator 420 and the predetermined calculation process performed by second data calculator 550 are identical to each other.

In an exemplary embodiment, the first data calculator 420 may perform the predetermined calculation process on the transmission data excluding the identification information. In another embodiment, the first data calculator 420 may perform the predetermined calculation process on the transmission data including the identification information. In an exemplary embodiment, (processing unit) for performing a predetermined process may be arranged at a subsequent stage to the identification information extractor 410 or at a prior stage to the first data calculator 420. The same process may be performed on the copy data in the second egress processing block 500 at the same timing.

The first data calculator 420 (or the first egress processing block 400) deletes the identification information from the transmission data, and then transmits the transmission data out of the data transmitter 100 via the "output port." In an exemplary embodiment, the first data calculator 420 (or the first egress processing block 400) may transmit the transmission data to the outside without deleting the identification information from the transmission data.

Notification of the identification information of the identification information extractor 410 and the result of the predetermined calculation process of the first data calculator 420 may be a method of sending an actual packet through a path. In another notification, a dedicated path for transferring the identification information and the result information is arranged between the cards (the first egress processing block 400 and the second egress processing block 500) within the data transmitter 100 and the identification information and the result information is transferred via the dedicated path. Also in another notification, the identification information and the result information may be transferred via a control communication path for notification of alarm information and the like.

It is important that the notification reliably transfers notification information and thus notifies a target card (the second egress processing block 500) of the notification information.

The second egress processing block 500 includes calculation result storage 510, delay unit 520, and identity determiner 530. The identity determiner 530 includes identification information extractor 540 and second data calculator 550.

The calculation result storage 510 stores the identification information transferred from the identification information extractor 410 and the result of the predetermined calculation process performed on the transmission data containing the identification information by the first data calculator 420 and transferred from the first data calculator 420. The calculation result storage 510 stores these pieces of information with the identification information mapped to the result information. In an exemplary embodiment, the calculation result storage 510 may be the RAM 730 storing these pieces of information.

In an exemplary embodiment, the calculation result storage 510 may delete the identification information and the result of the predetermined calculation process performed on the transmission data containing the identification information with a predetermined time elapse subsequent to the notification of these pieces of information. Also in an exemplary embodiment, the calculation result storage 510 may delete these pieces of information subsequent to the end of the process of the identity determiner 530 to be described later.

If there is data to be stored for a predetermined period of time or longer, the calculation result storage 510 may give to the outside an alarm indicating that the output of the copy data is insufficient in an exemplary embodiment. Although the transmission data is output via the standard output port only, an output port mirror operation is not completely performed on the copy data. The identification information may be arranged in order but the order can become erroneous. For the same reason, the calculation result storage 510 may give to the outside an alarm indicating that the output of the copy data is insufficient in an exemplary embodiment.

The delay unit 520 delays the execution timing of the process of the identity determiner 530 on the copy data transferred from the reception data copier 310 by a constant period of time. To this end, the delay unit 520 temporarily stores the copy data, and then transfers the copy data to the identity determiner 530 after a constant time elapse. The delay unit 520 may be a first—in and first-out (FIFO) circuit or may be a RAM.

The delay unit 520, if constructed of a RAM, temporarily stores the copy data on the RAM, then afterwards searches the RAM for the copy data containing the identification information stored on the calculation result storage 510, and notifies the identity determiner 530 of the copy data.

A processing unit for determining whether the copy data is the copy data to be processed by the identity determiner 530 may be arranged at a prior stage to the delay unit 520 so that the identity determiner 530 performs the process thereof on only particular copy data. If it is determined that the copy data is the copy data the identity determiner 530 is to process, the copy data is subjected to the process of the delay unit 520 and subsequent stages. If not, the copy data is output as is from the data transmitter 100.

The identification information extractor 540 extracts (detects) from the copy data transferred from the reception data copier 310 the identification information attached by the identification information attaching unit 210.

The second data calculator 550 performs a predetermined calculation process on the copy data transferred from the reception data copier 310.

In the predetermined calculation process, predetermined data corresponds to the result of the predetermined calculation process performed on the predetermined data. For example, the predetermined calculation process may be a CRC calculation process. The predetermined calculation process performed by the first data calculator 420 and the predetermined calculation process performed by second data calculator 550 are identical to each other.

In an exemplary embodiment, the second data calculator 550 may perform the predetermined calculation process on the transmission data excluding the identification information. In another embodiment, the second data calculator 550 may perform the predetermined calculation process on the transmission data including the identification information.

The identity determiner 530 then determines (verifies) identity between the transmission data and the copy data, based on the identification information and the calculation result responsive to the identification information stored on the calculation result storage 510 and the identification information extracted by the identification information extractor 540 and the calculation result responsive to the identification information. More specifically, the identity determiner 530 searches the calculation result storage 510 for the identification information extracted by the identification information extractor 540, and extracts the calculation result mapped to that identification information. The identity determiner 530 then compares the extracted calculation result with the calculation result by the second data calculator 550. If these calculation results match each other, the transmission data and the copy data are identical to each other.

The identity determiner 530 searches the calculation result storage 510 for the identification information extracted by the identification information extractor 540. In an exemplary embodiment, the identity determiner 530 may discard the copy data including the identification information (without transferring the copy data to the outside) if no corresponding identification information is stored on the calculation result storage 510. The identity determiner 530 further compares the calculation result of the extracted identification information with the calculation result by the second data calculator 550. In an exemplary embodiment, the identity determiner 530 may discard the copy data corresponding to the calculation result (without transferring the copy data to the outside) if the calculation results fail to match each other.

In an exemplary embodiment, the identity determiner 530 discards the copy data while issuing a predetermined alarm. In another embodiment, the identity determiner 530 may issue a predetermined alarm instead of discarding the copy data.

Upon determining that the transmission data is identical to the copy data, the identity determiner 530 (or the second egress processing block 500) deletes the identification information from the copy data and then transmits the copy data out of the data transmitter 100 via the output mirror port. In an exemplary embodiment, the identity determiner 530 (or the second egress processing block 500) may transmit the copy data to the outside without deleting the identification information from the copy data.

In an exemplary embodiment, (processing unit) performing a particular process on the copy data may be arranged at a prior stage or a subsequent stage to the identity determiner 530. The same process is performed on the transmission data in the first egress processing block 400 at the same timing.

Transmission data and a plurality of pieces of copy data of the transmission data may be transmitted in a data form of a multicast packet such as e-tree to the outside.

If the transmission data fails to arrive at the first egress processing block 400 in the data transmitter 100 illustrated in FIG. 3, the second data calculator 550 cannot perform the process thereof on the copy data responsive to the transmission data. A plurality of pieces of identification information and calculation results to be used by the identity determiner 530 are thus prepared in order to avoid such an inconvenience in the identity determination of the copy data and the transmission data.

In an embodiment to be discussed with reference to FIG. 5, a plurality of pieces of identification information and calculation results are thus prepared for the identity determiner 530 to perform the identity determination of the copy data and the transmission data.

Figure 5:
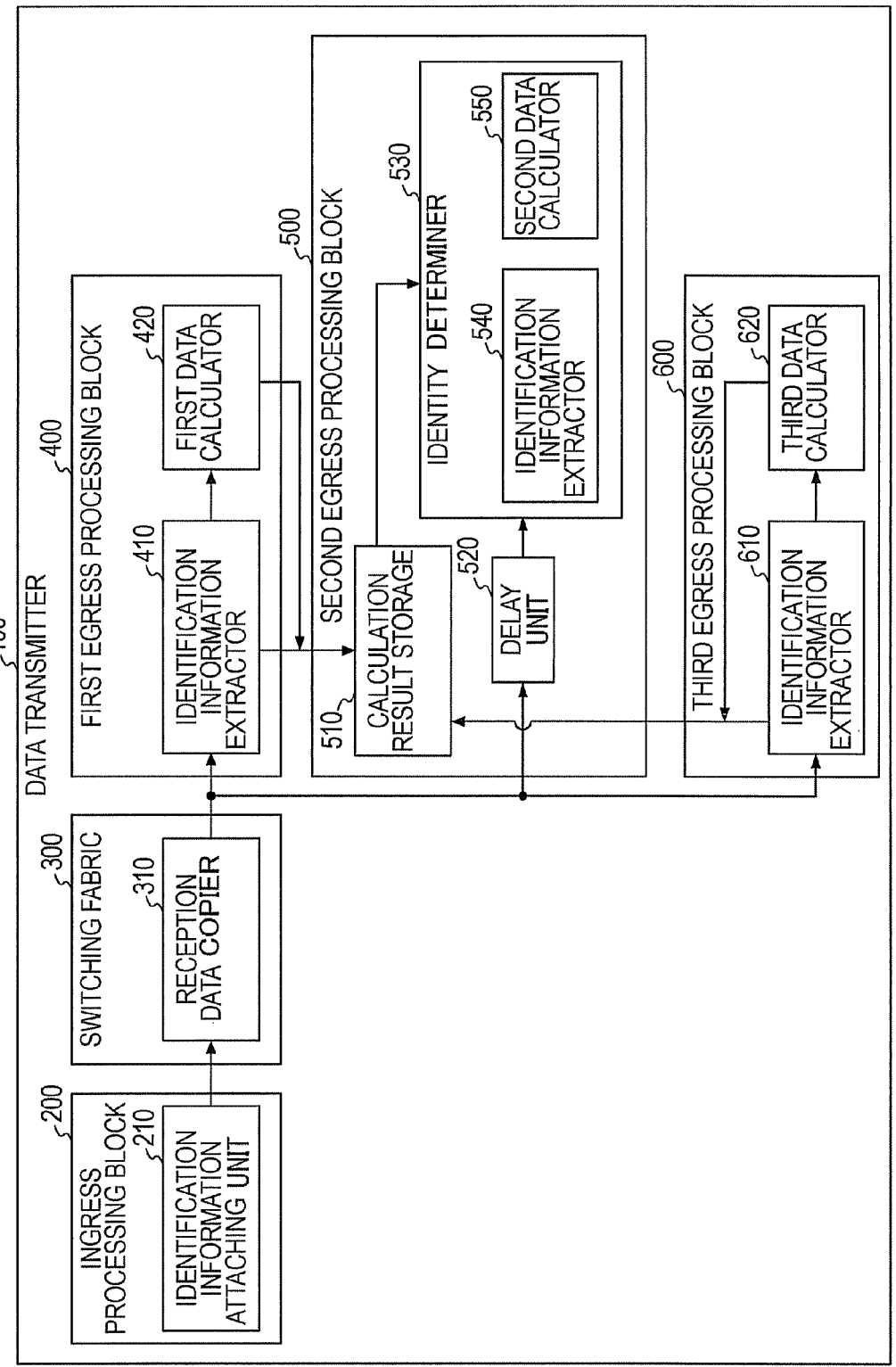
FIG. 5 illustrates a modification of the operation of the data transmitter of an exemplary embodiment.

As illustrated in FIG. 5, the data transmitter 100 includes a third egress processing block 600. The, such as the ingress processing block 200, the switch fabric 300, the first egress processing block 400, and the second egress processing block 500, execute the processes illustrated with reference to FIG. 3. The third egress processing block 600 includes identification information extractor 610 and third data calculator 620.

The identification information extractor 610 extracts (detects) the identification information attached by the identification information attaching 210 from the copy data transferred by the reception data copier 310, and notifies the calculation result storage 510 of the identification information.

Upon performing a predetermined calculation process on the copy data transferred by the reception data copier 310, the third data calculator 620 notifies the calculation result storage 510 of the result of the predetermined calculation process. In the predetermined calculation process, predetermined data corresponds to the result of the predetermined calculation process performed on the predetermined data. For example, the predetermined calculation process may be the CRC calculation process. The predetermined calculation processes performed by the first data calculator 420, the second data calculator 550, and the third data calculator 620 are identical to each other.

In an exemplary embodiment, the third data calculator 620 may perform the predetermined calculation process on the copy data excluding the identification information. In another embodiment, the third data calculator 620 may perform the predetermined calculation process on the copy data including the identification information. In an exemplary embodiment, (processing unit) performing a particular process on the copy data may be arranged at a prior stage to the identification information extractor 610 or at a subsequent stage to the third data calculator 620. The same process may be performed on the transmission data and the copy data in the first egress processing block 400 and the second egress processing block 500, respectively, at the same timing.

The third data calculator 620 (or the third egress processing block 600) deletes the identification information from the transmission data, and then transmits the transmission data out of the data transmitter 100 via the "output port." In an exemplary embodiment, the third data calculator 620 (or the third egress processing block 600) may transmit the transmission data to the outside without deleting the identification information from the transmission data.

Notification of the identification information by the identification information extractor 610 and the result of the predetermined calculation process by the third data calculator 620 may be a method of sending an actual packet through a path. In another notification, a dedicated path for transferring the identification information and the result information may be arranged between the cards (the second egress processing block 500 and the third egress processing block 600) within the data transmitter 100 and the identification information and the result information may be transferred via the dedicated path. Also in another notification, the identification information and the result information may be transferred via a control communication path for notification of alarm information and the like. It is important that the notification reliably transfers notification information and thus notifies a target card (the second egress processing block 500) of the notification information.

The calculation result storage 510 in the data transmitter 100 illustrated in FIG. 5 stores the identification information and the result of the predetermined calculation process on the transmission data including the identification information or on the copy data, supplied from the identification information extractor 410 and 610, the first data calculator 420, and the third data calculator 620. The calculation result storage 510 stores these pieces of information with identification information mapped to the result of the predetermined calculation process.

The identity determiner 530 searches the calculation result storage 510 for the identification information extracted by the identification information extractor 540, and extracts a plurality of calculation results stored with the identification information mapped thereto. The identity determiner 530 then compares the extracted calculation result with the calculation result of the second data calculator 550 and then determines that the transmission data is identical to the copy data if the calculation results match each other.

The identity determiner 530 may compare the extracted calculation result with the calculation result of the second data calculator 550 and may perform a different post process, such as discarding the copy data or issuing a predetermined alarm, depending on the comparison result.

If the transmission data is determined as being identical to the copy data, the identity determiner 530 deletes the identification information from the copy data and then transmits the copy data out of the data transmitter 100 via the multicast port. In another embodiment, the identity determiner 530 may transmit the copy data without deleting the identification information from the copy data.

In one modification to the data transmitter 100, a processor including the calculation result storage 510 and the identity determiner 530 may be separately arranged. The processor performs a verification process determining whether the transmission data is identical to the copy data. In this case, the second egress processing block 500 waits on standby for an instruction to output the copy data, an instruction to discard the copy data, and an instruction to issue an alarm from the identity determiner 530.

A process of a data transmitter 100 operating as discussed with reference to FIG. 3 is described below with reference to FIGS. 6-8.

A process of the ingress processing block 200 and the switch fabric 300 is described below with reference to FIG. 6. FIG. 6 illustrates a process of the ingress processing block 200 and the switch fabric 300.

In operation S10, the ingress processing block 200 (the data transmitter 100) starts the process thereof. In operation S20, the ingress processing block 200 receives the reception data, and the identification information attaching unit 210 attaches to the reception data the identification information identifying the reception data. The identification information starts with 0 or 1. Upon reaching a predetermined maximum value (10000, for example), the identification information returns to 0 or 1 to cycle through as a sequence number. It is important that the identification information identifies the reception data. In operation S20, the identification information attaching unit 210 transfers the reception data with the identification information attached thereto (the transmission data) to the switch fabric 300.

In operation S30, the switch fabric 300 receives the transmission data transmitted by the identification information attaching unit 210. The reception data copier 310 copies the transmission data with the identification information attached thereto by the identification information attaching unit 210, transfers the transmission data as the original data to the first egress processing block 400, and transfers the copy data to the second egress processing block 500. If there are a plurality of pieces of copy data, at least one egress processing block having the same function as that of the second egress processing block 500 is included. The other copy data is then transferred to another egress processing block, which performs the same process as the process of the second egress processing block 500 as discussed below.

In operation S40, the switch fabric 300 (the data transmitter 100) thus completes the copy and transfer process. The process example discussed with reference to FIG. 6 is related to a single piece of reception data. If a plurality of pieces of reception data are consecutively output, the same process described above is performed on each piece of reception data. The processes are thus consecutively performed on all pieces of reception data.

A process of the first egress processing block 400 and the second egress processing block 500 is described with reference to FIG. 7. FIG. 7 illustrates a process of the first egress processing block 400 and the second egress processing block 500.

In operation S50, the first egress processing block 400 (the data transmitter 100) starts the process thereof. In operation S60, the first egress processing block 400 receives the transmission data transferred by the reception data copier 310. The identification information extractor 410 extracts the identification information attached by the identification information attaching unit 210 from the transmission data.

In operation S70, the first data calculator 420 performs the predetermined calculation process on the transmission data received in operation S60. In the predetermined calculation process, predetermined data corresponds to the result of the predetermined calculation process performed on the predetermined data. For example, the predetermined calculation process may be the CRC calculation process. The predetermined calculation processes performed by the first data calculator 420 and the second data calculator 550 are identical to each other.

In operation S70, the first data calculator 420 may perform the predetermined calculation process on the transmission data excluding the identification information in an exemplary embodiment, or may perform the predetermined calculation process on the transmission data including the identification information in another embodiment.

In operation S80, the identification information extractor 410 and the first data calculator 420 notify the second egress processing block 500 of the identification information and the calculation result, respectively. If there are a plurality of pieces of copy data in operation S80, and at least one egress processing block having the same function as that of the second egress processing block 500 is included, such egress processing block is also notified of the identification information and the calculation result.

In operation S80, the calculation result storage 510 stores the identification information and the result of the predetermined calculation process performed on the transmission data including the identification information respectively notified of by the identification information extractor 410 and the first data calculator 420. The calculation result storage 510 stores these pieces of information with the identification information mapped to the calculation result. In an exemplary embodiment, the calculation result storage 510 may be a RAM storing these pieces of information.

In operation S80, the first egress processing block 400 deletes the identification information from the transmission data and then transmits the transmission data out of the data transmitter 100 via the output port. In operation S90, the first egress processing block 400 completes the process of generating the data for verifying the identity of the copy data.

Figure 7:
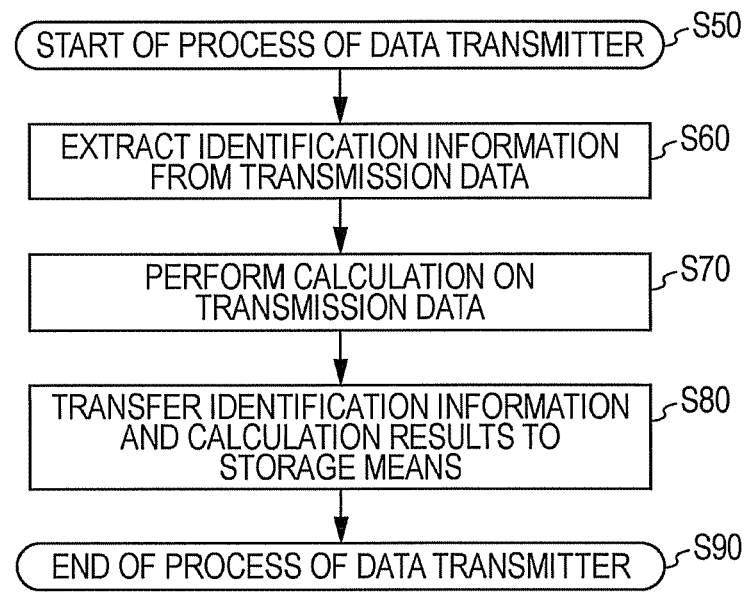
FIG. 7 illustrates a process of the data transmitter of an exemplary embodiment.

The process example discussed with reference to FIG. 7 is related to a single piece of reception data. If a plurality of pieces of reception data are consecutively output, the same process described above is performed on each piece of reception data. The processes are thus consecutively performed on all pieces of reception data.

In an exemplary embodiment, (processing unit) for performing a predetermined process may be arranged at a subsequent stage to the identification information extractor 410 or at a prior stage to the first data calculator 420. The same process may be performed on the copy data in the second egress processing block 500 at the same timing.

Figure 8:
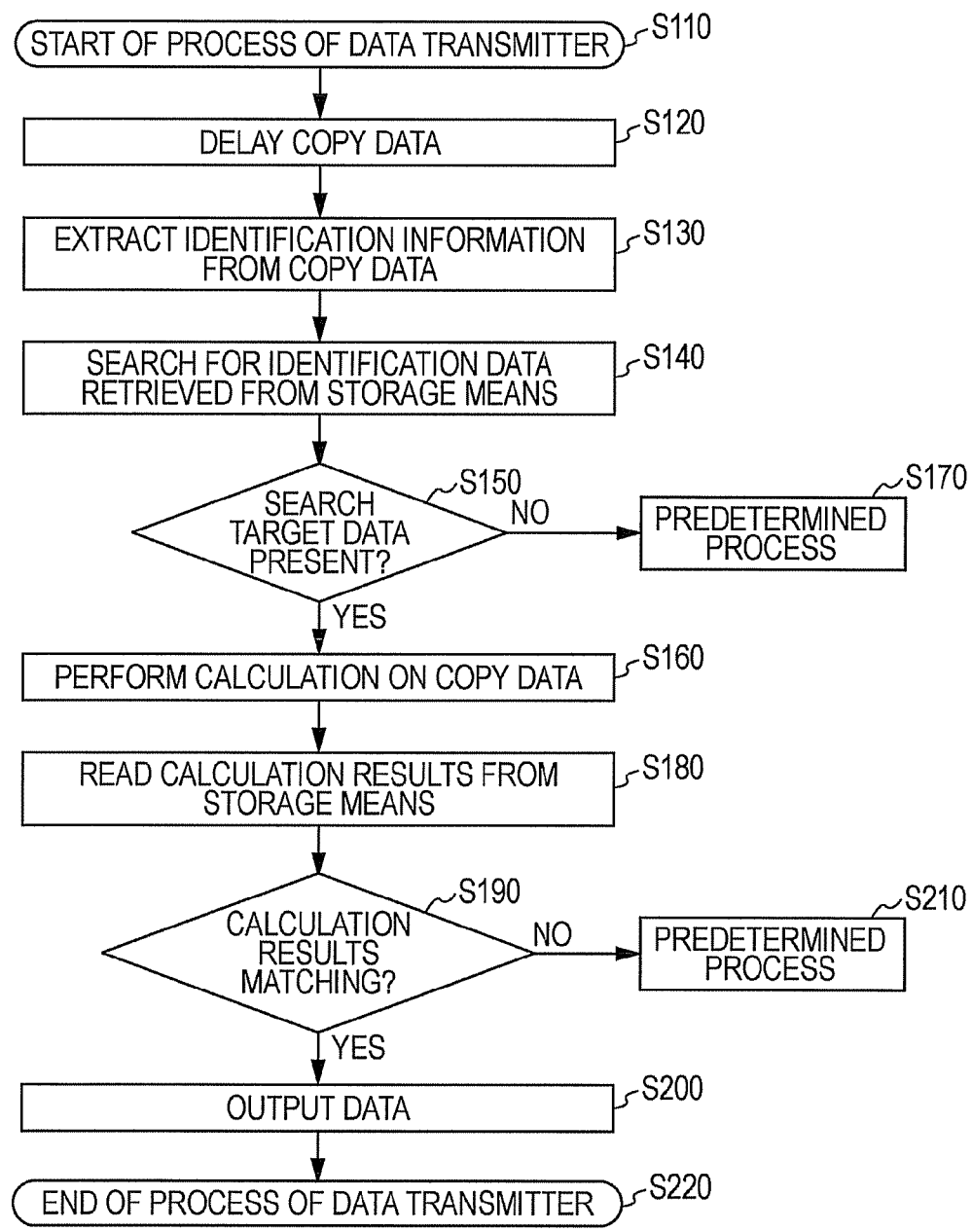
FIG. 8 illustrates a process of the data transmitter of an exemplary embodiment.

Referring to FIG. 8, a process of the second egress processing block 500 is described. FIG. 8 illustrates a process of the second egress processing block 500.

In operation S110, the second egress processing block 500 (the data transmitter 100) starts the process thereof. In operation S120, the second egress processing block 500 receives the copy data transferred by the reception data copier 310. In operation S120, the delay unit 520 temporarily stores the copy data so that the timing of the process execution of the subsequent identity determiner 530 is delayed by a constant time. After a constant time elapse, the delay unit 520 transfers the copy data to the identity determiner 530. The delay unit 520 may be a FIFO digital circuit in an exemplary embodiment, or a RAM in another embodiment.

The delay unit 520, if constructed of the RAM, temporarily stores the copy data. The delay unit 520 then searches the RAM for the copy data including the identification information stored on the calculation result storage 510 and then transfers the copy data to the identity determiner 530.

In operation S130, the identification information extractor 540 extracts the identification information attached by the identification information attaching unit 210 from the copy data transferred by the delay unit 520. In operation S140, the identity determiner 530 searches the calculation result storage 510 for the identification information extracted by the identification information extractor 540.

If it is determined in operation S150 that the identification information as a search target of the identity determiner 530 is hit (YES in operation S150), the second data calculator 550 performs the predetermined calculation process on the copy data transferred by the delay unit 520 in operation S160. The predetermined calculation processes of the first data calculator 420 and the second data calculator 550 are identical to each other. The first data calculator 420 may perform the predetermined calculation process on the copy data excluding the identification information in an exemplary embodiment, or may perform the predetermined calculation process on the copy data including the identification information in another embodiment.

If the identification information as a search target of the identity determiner 530 is not found (NO in operation S150), the second egress processing block 500 discards the copy data corresponding to the identification information (without transmitting the copy data to the outside) or issues a predetermined alarm.

In operation S180, the identity determiner 530 extracts from the calculation result storage 510 the calculation result corresponding to the identification information as the search target of the identity determiner 530, and compares the extracted calculation result with the calculation result of the second data calculator 550 in operation S160.

If the identity determiner 530 determines that the two calculation results match each other in operation S190 (YES in operation S190), the second egress processing block 500 deletes the identification information from the copy data, and transmits the copy data out of the data transmitter 100 via the output mirror port in operation S200.

If the identity determiner 530 determines that the two calculation results fail to match each other in operation S190 (NO in operation S190), the second egress processing block 500 discards the copy data corresponding to the identification information (without transmitting the copy data to the outside) or issues a predetermined alarm in operation S210. In operation S220, the second egress processing block 500 terminates the process.

The process example discussed with reference to FIG. 8 may be related to a single piece of reception data. If a plurality of pieces of reception data are consecutively output, the same process described above is performed on each piece of reception data. The processes are thus consecutively performed on all pieces of reception data.

In an exemplary embodiment, (processing unit) for performing a predetermined process may be arranged at a prior stage to the identification information extractor 540 or at a prior stage to the second data calculator 550. The same process may be performed on the transmission data in the first egress processing block 400 at the same timing.

An exemplary process of the data transmitter may be modified.

The exemplary processes discussed with reference to FIGS. 6-8 may be based on the operation discussed with reference to FIG. 3. The process example based on the operation discussed with reference to FIG. 5 is described below.

Figure 6:
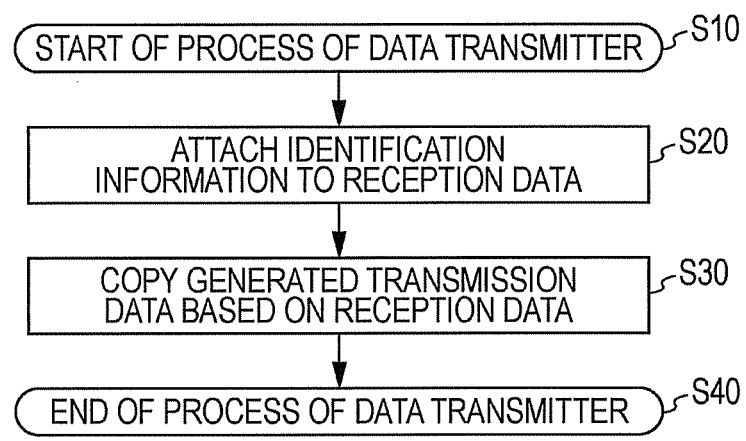
FIG. 6 illustrates a process of the data transmitter of an exemplary embodiment.

Exemplary differences of a process example from the process example discussed with reference to FIGS. 6-8 are discussed.

In operation S30, the reception data copier 310 generates a plurality of pieces of copy data and then transfers the copy data to each of the second egress processing block 500 and the third egress processing block 600.

In operation S60, the identification information extractor 410 and 610 extract the identification information from the transmission data or the copy data. In operation S70, the first data calculator 420 performs the predetermined calculation process on the transmission data and the third data calculator 620 performs the predetermined calculation process on the copy data. In operation S80, the identification information extractor 410 and 610 notify the second egress processing block 500 of the identification information, and the first data calculator 420 and the third data calculator 620 notify the second egress processing block 500 of the calculation results. The calculation result storage 510 then stores these pieces of information.

In operation S180, the identity determiner 530 searches the calculation result storage 510 for the identification information extracted by the identification information extractor 540, and extracts a plurality of calculation results stored with the identification information mapped thereto. The identity determiner 530 then compares the extracted calculation result with the calculation result of the second data calculator 550. In operations S200 and S210, the second egress processing block 500 performs the predetermined processes depending on the comparison result.

The data transmitter disclosed here produces the transmission data based on the reception data, and the copy data copied from the transmission data, and then transmits the transmission data and the copy data. The data transmitter can thus verify whether the transmission data is identical to the copy data.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of an exemplary embodiments, any combinations of the described features, functions and/or operations can be provided.

The many features and advantages of an exemplary embodiments are apparent from the detailed specification and, thus, it is intended by the appended claims to cover all such features and advantages of an exemplary embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A data transmitter configured to transmit reception data and copy data of the reception data for transmission via respective separate ports, comprising:
    a memory; and
    a processor that executes a procedure in the memory, the procedure including:
        an identification information attaching process configured to attach, to the reception data, identification information identifying the reception data;
        a reception data copying process configured to copy the reception data with the identification information attached thereto in response to a determination to copy the reception data;
        a calculation process configured to perform a calculation operation on the reception data to be transmitted on a first port and on copy data copied by the reception data copying process to be transmitted on a second port; and
        an identity determiner process configured to verify the copy data to be transmitted on the second port, based on the identification data attached to the reception data and the copy data, and calculation results of calculation operations on the reception data and the copy data.

2. The data transmitter according to claim 1, wherein the identity determiner process verifies that the reception data is identical to the copy data if a calculation result of the calculation operation on the reception data matches a calculation result of the calculation operation on the copy data.

3. The data transmitter according to claim 1, wherein the reception data copying process generates at least two pieces of copy data; and
    wherein on basis of a calculation result of the calculation operation for the first port on the reception data and a calculation result of the calculation operation for the second port on one piece of copy data, the identity determiner process verifies whether the reception data is identical to another piece of copy data.

4. The data transmitter according to claim 1, further comprising a plurality of interface cards, each card having one port,
    wherein one interface card includes a first calculator configured to perform the calculation operation for the first port on the reception data, and
    wherein another interface card includes a data calculator performing the calculation operation for the second port on the copy data and performing the identity determiner process.

5. The data transmitter according to claim 1, wherein the procedure further including:
    a delay process configured to delay the timing of the calculation operation on the copy data; and
    a calculation result storage process configured to store the reception data with the identification information attached thereto with the identification information mapped to the calculation result thereof.

6. A data transmission method of a data transmitter configured to transmit reception data and copy data of the reception data for transmission via respective separate ports, comprising:
    attaching, to the reception data, identification information identifying the reception data;
    copying the reception data with the identification information attached thereto in response to a determination to copy the reception data;
    performing a calculation operation on the reception data to be transmitted on a first port and on copy data copied by the reception data copying to be transmitted on a second port; and
    verifying the copy data to be transmitted on the second port, based on the identification data attached to the reception data and the copy data, and calculation results of calculation operations on the reception data and the copy data.

7. The data transmission method according to claim 6, wherein the identity determining verifies that the reception data is identical to the copy data if a calculation result of the calculation operation on the reception data matches a calculation result of the calculation operation on the copy data.

8. The data transmission method according to claim 6, wherein the reception data copying generates at least two pieces of copy data; and
    wherein on basis of a calculation result of the calculation operation for the first port on the reception data and a calculation result of the calculation operation for the second port on one piece of copy data, the identity determining verifies whether the reception data is identical to another piece of copy data.

9. The data transmission method according to claim 6, wherein the data transmitter includes a plurality of interface cards, each card having one port, and a procedure in the interface cards including:
    calculating in one interface card, the calculation operation for the first port on the reception data, and
    calculating in another interface card, the calculation operation for the second port on the copy data and performing the identity determining.

10. The data transmission method according to claim 6, further comprising:
    delaying the timing of the calculation operation on the copy data; and
    storing the reception data with the identification information attached thereto with the identification information mapped to the calculation result thereof.

11. A data transmitter, comprising:
    a memory; and
    a processor that executes a procedure in the memory, the procedure including:
        a calculator process configured to perform a calculation on data with an attached identification data and on a copy of the data with the attached identification; and a determining process configured to verify the copy of the data to be transmitted on a second port, based on the identification data and results of the calculation.

12. The data transmitter according to claim 1, wherein
the calculation process is further configured to map a calculation result of the calculation operation to the identification data for the reception data; and
the identity determiner process is further configured to verify the copy data to be transmitted on the second port, based on a search of the mapped identification data for the reception data and the calculation results of the calculation operations on the reception data and the copy data.

13. The data transmitter method according to claim 6, further comprising:
mapping a calculation result of the calculation operation to the identification data for the reception data; and
verifying the copy data to be transmitted on the second port, based on a search of the mapped identification data for the reception data and the calculation results of the calculation operations on the reception data and the copy data.

14. The data transmitter according to claim 11, wherein
the calculator process is further configured to map a calculation result of the calculation to the identification data; and
the determining process is further configured to verify whether the data with the identification data attached thereto matches the copy data, based on a search of the identification data and the calculation results.

15. The data transmitter according to claim 12, the procedure further including a delay process configured to delay a timing of the calculation operation on the copy data.

16. The data transmitter method according to claim 13, further comprising delaying a timing of the calculation operation on the copy data.

17. The data transmitter according to claim 14, the procedure further including a delay process configured to delay a timing of the calculation operation on the copy data.

* * * * *

UNITED STATES PATENT AND TRADEMARK OFFICE
CERTIFICATE OF CORRECTION

| | | |
|---|---|---|
| PATENT NO. | : 8,611,207 B2 | Page 1 of 1 |
| APPLICATION NO. | : 12/607687 | |
| DATED | : December 17, 2013 | |
| INVENTOR(S) | : Takakuwa | |

It is certified that error appears in the above-identified patent and that said Letters Patent is hereby corrected as shown below:

In the Claims:

In Column 15, Line 14, In Claim 13, delete "data transmitter method" and insert -- data transmission method --, therefor.

In Column 16, Line 15, In Claim 16, delete "data transmitter method" and insert -- data transmission method --, therefor.

Signed and Sealed this
Twenty-fifth Day of March, 2014

Michelle K. Lee
*Deputy Director of the United States Patent and Trademark Office*